United States Patent
Pandey et al.

(10) Patent No.: US 9,031,499 B2
(45) Date of Patent: May 12, 2015

(54) CAR-TO-X COMMUNICATION SYSTEM, PARTICIPANT IN SUCH A SYSTEM, AND METHOD FOR RECEIVING RADIO SIGNALS IN SUCH A SYSTEM

(75) Inventors: Mohinder Pandey, Ingolstadt (DE);
Wilhelm Bairlein, Rennertshofen (DE);
Claudia Kratzsch, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/352,817

(22) PCT Filed: Aug. 11, 2012

(86) PCT No.: PCT/EP2012/003441
§ 371 (c)(1),
(2), (4) Date: Apr. 18, 2014

(87) PCT Pub. No.: WO2013/056760
PCT Pub. Date: Apr. 25, 2013

(65) Prior Publication Data
US 2014/0242904 A1    Aug. 28, 2014

(30) Foreign Application Priority Data
Oct. 20, 2011   (DE) .................. 10 2011 116 637

(51) Int. Cl.
*H04B 7/24*        (2006.01)
*H04W 88/04*      (2009.01)
(Continued)

(52) U.S. Cl.
CPC .............. *H04B 7/24* (2013.01); *H04W 76/023* (2013.01); *H04W 84/18* (2013.01); *H04W 88/04* (2013.01)

(58) Field of Classification Search
CPC ... H04W 88/14; H04W 76/023; H04W 84/18; H04B 7/24

USPC ........................................................... 455/39
See application file for complete search history.

(56) References Cited

U.S. PATENT DOCUMENTS 5,797,088 A * 8/1998 Stamegna .................... 455/345
5,890,054 A * 3/1999 Logsdon et al. ............ 455/11.1
(Continued)

FOREIGN PATENT DOCUMENTS

DE   102007034058   2/2009
DE   102010029483   1/2011
(Continued)

OTHER PUBLICATIONS

Dr. Hans-Joachim Fischer, "Intelligent Transport Systems (ITS)," ESF News, Elektrische Signalverarbeitung Dr. Fischer GmbH, Issue 2011/1, Feb. 2011, 8 pages.
(Continued)

*Primary Examiner* — Hai V Nguyen
(74) *Attorney, Agent, or Firm* — Staas & Halsey LLP

(57) ABSTRACT

Motor vehicles as well as infrastructure stations, which are stationary and which are installed on the side of the road such as traffic light systems for example, are provided as participants in a Car-to-X network. The vehicles include an automobile radio together with the communication unit for communicating with other participants of the network. In the event that such a vehicle travels through a region, for example a tunnel or a forest, in which a direct antenna reception of the radio signal of the radio station set in the automobile radio is poor or impossible and thus the reception quality of said radio signal is poor, the driver can be irritated or angered due to static or other disruptive noises as well as a loss of sound. Reception of radio signals in a Car-to-X communication system is improved by forwarding radio signals from one user to another.

17 Claims, 2 Drawing Sheets

(51) Int. Cl.
*H04W 76/02* (2009.01)
*H04W 84/18* (2009.01)

(56) References Cited

U.S. PATENT DOCUMENTS

| | | | |
|---|---|---|---|
| 5,930,729 A * | 7/1999 | Khamis et al. | 455/571 |
| 6,236,337 B1 * | 5/2001 | Beier et al. | 340/905 |
| 6,359,714 B1 * | 3/2002 | Imajo | 398/178 |
| 6,615,137 B2 * | 9/2003 | Lutter et al. | 701/301 |
| 6,759,942 B2 * | 7/2004 | Bedi et al. | 340/5.72 |
| 6,785,511 B1 * | 8/2004 | Hengeveld et al. | 455/16 |
| 6,795,685 B2 * | 9/2004 | Walkup | 455/11.1 |
| 6,865,609 B1 * | 3/2005 | Gubbi et al. | 709/230 |
| 7,003,261 B2 * | 2/2006 | Dietz et al. | 455/11.1 |
| 7,107,066 B2 * | 9/2006 | Toth et al. | 455/458 |
| 7,355,525 B2 * | 4/2008 | Tengler et al. | 340/905 |
| 7,382,274 B1 * | 6/2008 | Kermani et al. | 340/901 |
| 7,386,274 B2 * | 6/2008 | Weigand | 455/11.1 |
| 7,395,067 B2 * | 7/2008 | Weigand | 455/443 |
| 7,406,295 B1 * | 7/2008 | Yarkosky | 455/9 |
| 7,421,321 B2 * | 9/2008 | Breed et al. | 701/33.6 |
| 7,425,903 B2 * | 9/2008 | Boss et al. | 340/902 |
| 7,480,486 B1 * | 1/2009 | Oh et al. | 455/7 |
| 7,555,370 B2 * | 6/2009 | Breed et al. | 701/2 |
| 7,613,564 B2 * | 11/2009 | Vorona | 701/117 |
| 7,634,352 B2 * | 12/2009 | Soulchin et al. | 701/117 |
| 7,680,109 B2 * | 3/2010 | Lundin et al. | 370/390 |
| 7,711,383 B2 * | 5/2010 | Namm et al. | 455/519 |
| 7,738,871 B2 * | 6/2010 | Olvera-Hernandez et al. | 455/436 |
| 7,747,468 B2 * | 6/2010 | Ji et al. | 705/26.1 |
| 7,941,108 B2 * | 5/2011 | Shaffer et al. | 455/115.3 |
| 7,957,298 B2 * | 6/2011 | Yi et al. | 370/242 |
| 7,974,772 B2 * | 7/2011 | Nitz et al. | 701/117 |
| 7,979,198 B1 * | 7/2011 | Kim et al. | 701/117 |
| 8,032,081 B2 * | 10/2011 | Bai et al. | 455/11.1 |
| 8,064,907 B2 * | 11/2011 | Gallagher et al. | 455/435.1 |
| 8,169,338 B2 * | 5/2012 | Mudalige | 340/901 |
| 8,233,455 B2 * | 7/2012 | Shaheen et al. | 370/331 |
| 8,451,752 B2 * | 5/2013 | Lu | 370/254 |
| 8,451,812 B2 * | 5/2013 | Stahlin et al. | 370/338 |
| 8,457,123 B2 * | 6/2013 | Grotendorst et al. | 370/389 |
| 8,473,196 B2 * | 6/2013 | Basnayake | 701/412 |
| 8,477,634 B2 * | 7/2013 | Yi et al. | 370/242 |
| 8,538,453 B2 * | 9/2013 | Kekki et al. | 455/436 |
| 8,577,596 B2 * | 11/2013 | Stahlin et al. | 701/409 |
| 8,644,844 B2 * | 2/2014 | Shapira et al. | 455/456.1 |
| 8,666,591 B2 * | 3/2014 | Stahlin et al. | 701/32.4 |
| 8,666,827 B2 * | 3/2014 | Ji et al. | 705/26.1 |
| 8,681,773 B2 * | 3/2014 | Chazel et al. | 370/351 |
| 8,682,285 B2 * | 3/2014 | Stahlin et al. | 455/404.2 |
| 8,688,376 B2 * | 4/2014 | Stahlin et al. | 701/517 |
| 8,699,466 B2 * | 4/2014 | Kim et al. | 370/332 |
| 8,731,579 B2 * | 5/2014 | Siomina et al. | 455/456.1 |
| 8,737,191 B2 * | 5/2014 | Freda et al. | 370/208 |
| 8,750,098 B2 * | 6/2014 | Fan et al. | 370/225 |
| 8,750,862 B2 * | 6/2014 | Rahman | 455/425 |
| 8,755,793 B2 * | 6/2014 | Ulupinar et al. | 455/432.2 |
| 8,781,733 B2 * | 7/2014 | Staehlin et al. | 701/450 |
| 8,862,384 B2 * | 10/2014 | Stahlin et al. | 701/409 |
| 8,892,041 B2 * | 11/2014 | Gansen et al. | 455/41.2 |
| 2004/0192193 A1 * | 9/2004 | Silvester | 455/11.1 |
| 2004/0203706 A1 * | 10/2004 | Dietz et al. | 455/422.1 |
| 2005/0273218 A1 * | 12/2005 | Breed et al. | 701/2 |
| 2007/0146162 A1 * | 6/2007 | Tengler et al. | 340/905 |
| 2008/0114502 A1 * | 5/2008 | Breed et al. | 701/2 |
| 2009/0268635 A1 * | 10/2009 | Gallagher et al. | 370/254 |
| 2009/0268722 A1 * | 10/2009 | Gallagher et al. | 370/352 |
| 2009/0270097 A1 * | 10/2009 | Gallagher et al. | 455/435.1 |
| 2009/0270098 A1 * | 10/2009 | Gallagher et al. | 455/435.1 |
| 2009/0270099 A1 * | 10/2009 | Gallagher et al. | 455/435.1 |
| 2010/0216454 A1 * | 8/2010 | Ishida et al. | 455/424 |
| 2010/0217455 A1 * | 8/2010 | Stahlin et al. | 701/1 |
| 2010/0255866 A1 * | 10/2010 | Radtchenko | 455/500 |
| 2010/0303048 A1 * | 12/2010 | Stahlin et al. | 370/338 |
| 2011/0047338 A1 * | 2/2011 | Stahlin et al. | 711/154 |
| 2011/0054716 A1 * | 3/2011 | Stahlin et al. | 701/1 |
| 2011/0098877 A1 * | 4/2011 | Stahlin et al. | 701/33 |
| 2011/0205908 A1 * | 8/2011 | Yi et al. | 370/242 |
| 2011/0222426 A1 * | 9/2011 | Chazel et al. | 370/252 |
| 2012/0026865 A1 * | 2/2012 | Fan et al. | 370/225 |
| 2012/0053888 A1 * | 3/2012 | St hlin et al. | 702/150 |
| 2012/0057872 A1 * | 3/2012 | Freda et al. | 398/76 |
| 2012/0100847 A1 * | 4/2012 | Rahman | 455/424 |
| 2012/0220231 A1 * | 8/2012 | St hlin et al. | 455/41.2 |
| 2012/0258729 A1 * | 10/2012 | Siomina et al. | 455/456.1 |
| 2013/0124083 A1 * | 5/2013 | Kratzsch et al. | 701/410 |
| 2013/0158862 A1 * | 6/2013 | St hlin et al. | 701/410 |
| 2013/0165146 A1 * | 6/2013 | Stahlins et al. | 455/456.1 |
| 2013/0245941 A1 * | 9/2013 | Stahlin et al. | 701/532 |
| 2013/0265866 A1 * | 10/2013 | Yi et al. | 370/216 |
| 2013/0265983 A1 * | 10/2013 | Jelinek | 370/330 |
| 2014/0104077 A1 * | 4/2014 | Engel et al. | 340/901 |
| 2014/0235233 A1 * | 8/2014 | Rahman | 455/424 |
| 2014/0235261 A1 * | 8/2014 | Fan et al. | 455/452.1 |

FOREIGN PATENT DOCUMENTS

| | | |
|---|---|---|
| DE | 102010029748 | 2/2011 |
| DE | 102010028876 | 4/2011 |
| DE | 102011116637.1 | 10/2011 |
| EP | 1838050 | 9/2007 |
| EP | 1876774 | 1/2008 |
| EP | PCT/EP2012/003441 | 8/2012 |
| WO | 2007/060084 | 5/2007 |
| WO | 2009/074655 | 6/2009 |

OTHER PUBLICATIONS

Dr. Hans-Joachim Fischer, "Intelligent Transport Systems (ITS)," ESF News, Elektrische Signalverarbeitung Dr. Fischer GmbH, Issue 2010/1, Feb. 2010, 8 pages.
Lars Wischhof et al., "Information Dissemination in Self-Organizing Intervehicle Networks," IEEE Transactions on Intelligent Transportation Systems, vol. 6, No. 1, Mar. 2005, pp. 90-101.
English language International Search Report for PCT/EP2012/003441, mailed Nov. 19, 2012, 2 pages.
WIPO English Language Translation of the International Preliminary Report on Patentability for PCT/EP2012/003441, mailed May 1, 2014, 7 pages.

* cited by examiner

CAR-TO-X COMMUNICATION SYSTEM, PARTICIPANT IN SUCH A SYSTEM, AND METHOD FOR RECEIVING RADIO SIGNALS IN SUCH A SYSTEM

CROSS REFERENCE TO RELATED APPLICATIONS

This application is based on and hereby claims priority to International Application No. PCT/EP2012/003441 filed on Aug. 11, 2012 and German Application No. 10 2011 116 637.1 filed on Oct. 20, 2011, the contents of which are hereby incorporated by reference.

BACKGROUND

The invention relates to a Car-2-X communications system, users in a Car-2-X communications system and a method for receiving radio signals in a Car-2-X communications system.

In the related art, such systems, users and methods are known, for example, from the Car-2-X network, for which ETSI (short for "European Telecommunications Standards Institute") is developing standards and specifications. This known network comprises both motor vehicles and infrastructure stations, which are stationary and, for example like traffic lights, are installed at the roadside. In addition to the communications unit for communicating with other users of the network, these vehicles also comprise a car radio.

If such a vehicle is traveling through an area such as a tunnel or forest in which direct aerial-reception of the radio signal of the radio station set in the car radio is only poor or not possible at all, and hence the reception quality of this radio signal is poor, the driver may be distracted and irritated by noise and other interference and by loss of sound.

SUMMARY

One possible object is to improve the reception of radio signals in a Car-2-X communications system.

The inventors propose a Car-2-X communications system, a user in a Car-2-X communications system, a user in a Car-2-X communications system and a method for receiving radio signals in a Car-2-X communications system.

According to a first aspect, the inventors propose a Car-2-X communications system comprising
at least two users;
wherein
a first user comprises
a first communications unit for receiving messages from the communications system and for sending messages into the communications system;
a first radio receiver for receiving radio signals;
a second user comprises
a second communications unit for receiving messages from the communications system and for sending messages into the communications system;
a second radio receiver for receiving radio signals;
the first user further comprises
a first control unit, which is coupled to the first communications unit and to the first radio receiver;
the first control unit is designed such that it
monitors a first reception quality of a radio signal received by the first radio receiver;
if the first reception quality is less than a predetermined first threshold value, generates a request message requesting transmission of radio signals via the communications system, and sends by the first communications unit said request message into the communications system;
if the first communications unit receives from the second user an offer message, which contains a second reception quality of a radio signal received by the second user, on the basis of this offer message selects or does not select the second user as a partner;
if the second user is selected as a partner, generates a response message, which notifies a connection to the partner via the communications system for transmitting the radio signal received by the partner, and sends by the first communications unit said response message to the partner;
establishes the connection to the partner by the first communications unit;
routes the transmitted radio signal to the first radio receiver and instructs same to substitute this signal for the radio signal that it receives;
the second user further comprises
a second control unit, which is coupled to the second communications unit and to the second radio receiver;
the second control unit is designed such that it
monitors the second reception quality;
if the second communications unit receives from the first user the request message, and if the second reception quality is greater than or equal to a predetermined second threshold value, sends by the second communications unit the offer message to the first user;
if the second communications unit receives the response message, by the second communications unit establishes the connection to the first user and transmits the radio signal received by the second radio receiver to the first user.

Since the transmitted radio signal received by the second radio receiver has a better reception quality than the radio signal received by the first radio receiver, the reception of radio signals in the Car-2-X communications system is improved.

The first user can be, for example, one of the proposed users according to the second aspect of the proposals, and the second user can be, for example, one of the proposed users according to the third aspect of the proposals.

Each of the control units can be designed in any way to suit requirements, for example in such a way that each control unit determines the particular reception quality at least on the basis of a signal strength of the particular radio signal that it is receiving. Alternatively or additionally, however, other criteria can also be used, for instance those used for the quality of service (QoS for short).

The multi-hopping concept is preferably used, so that the second user sends by its communications unit the request message to further, third users of the communications system that lie outside the range of the first user, receives by its communications unit offer messages from such third users and sends said offer messages to the first user, sends by its communications unit response messages to such third users, and by its communications unit receives third radio signals, which are received by such third users, from such third users and sends said radio signals to the first user.

The first control unit can be designed such that if the first reception quality is greater than or equal to the threshold value, the connection to the partner is cleared by the first communications unit.

This removes the load from the communications system as soon as the transmission is no longer required or useful.

The first control unit can be designed in any way to suit requirements, for example in such a way that it sets the first threshold value equal to the second reception quality.

Thus, by comparing the first reception quality with the first threshold value, the first control unit can simultaneously compare the first reception quality with the second reception quality.

Alternatively or additionally, the request message can contain the first reception quality.

The second user can thus compare the first reception quality with the second reception quality and then generate or not generate the offer message according to the comparison result.

The second control unit can be designed in any way to suit requirements, for example in such a way that if the request message contains the first reception quality, it sets the second threshold value equal to the first reception quality.

By comparing the second reception quality with the second threshold value, the second control unit can thus simultaneously compare the first reception quality with the second reception quality and then respond appropriately according to the comparison result, for example by generating or not generating the offer message.

Each radio receiver can be designed in any way to suit requirements, and, for example, can comprise a radio and/or a television and/or a mobile phone and/or a navigation unit.

Each control unit can be designed in any way to suit requirements. For instance, it can be designed separately from the respective communications unit and/or the respective radio receiver or can be integrated in the respective communications unit and/or the respective radio receiver.

The radio signals can be, for example, broadcast signals such as analog radio signals (FM, MW, LW) or digital radio signals (DAB, IBOC, SDARS) or analog or digital television signals or Traffic Message Channel signals (TMC), or mobile communications signals (telephony, SMS, Internet) or satellite navigation signals (GPS).

The first control unit is preferably designed such that it adds to the request message information about the station or channel currently set in the first radio receiver.

The second user can thus set in the second radio receiver of same this station or channel, or an alternative station or alternative channel assigned to this station or channel respectively, preferably using information about radio broadcasts provided by RDS.

The second user can further comprise an additional radio receiver for receiving radio signals which is coupled to the second control unit, wherein
  the request message contains information about a channel required by the first user;
  the second control unit is designed such that it
    sets the additional radio receiver to this channel or to an alternative channel assigned to this channel.

Hence the second radio receiver can continue to work unchanged and, for example, play the radio station set by the driver, and use the additional radio receiver for the requested support for the first user.

The second user can further comprise a navigation unit which is coupled to the second control unit, wherein
  the second control unit is designed such that it
    determines the current location of the second user by the navigation unit;
    adds the current location to the offer message.

The first user can thus compare its own current location with that of the second user and then respond appropriately according to the comparison result, for example by generating or not generating the response message.

The first user can further comprise a navigation unit which is coupled to the first control unit, wherein
  the first control unit is designed such that it
    determines the current location of the first user by the navigation unit;
    adds the current location to the request message.

The second user can thus compare its own current location with that of the first user and then respond appropriately according to the comparison result, for example by generating or not generating the request message.

According to a second aspect, the inventors propose a user in a Car-2-X communications system, in particular in one of the proposed Car-2-X communications systems, comprising
  a communications unit for receiving messages from the communications system and for sending messages into the communications system;
  a radio receiver for receiving radio signals;
  a control unit, which is coupled to the communications unit and to the radio receiver;
  wherein
  the control unit is designed such that it
    monitors a first reception quality of a radio signal received by the radio receiver;
    if the first reception quality is less than a predetermined threshold value, generates a request message requesting transmission of radio signals via the communications system, and sends by the communications unit said request message into the communications system;
    if the communications unit receives from another user of the communications system an offer message, which contains a second reception quality of a radio signal received by the other user, on the basis of this offer message selects or does not select the other user as a partner;
    if a partner is selected, generates a response message, which notifies a connection to the partner via the communications system for transmitting the radio signal received by the partner, and sends by the communications unit said response message to the partner;
    establishes the connection to the partner by the communications unit;
    routes the transmitted radio signal to the radio receiver and instructs same to substitute this signal for the radio signal that it receives.

The user can be, for example, the first user in one of the proposed Car-2-X communications systems according to the first aspect.

The Car-2-X communications system can be, for example, one of the proposed Car-2-X communications systems according to the first aspect, and the other user can be, for example, one of the proposed users according to the third aspect.

According to a third aspect, the inventors propose a user in a Car-2-X communications system, in particular in one of the proposed Car-2-X communications systems, comprising
  a communications unit for receiving messages from the communications system and for sending messages into the communications system;
  a radio receiver for receiving radio signals;
  characterized by
  a control unit, which is coupled to the communications unit and to the radio receiver;
  wherein
  the control unit is designed such that it monitors a reception quality of a radio signal received by the radio receiver;

if the communications unit receives from another user of the communications system a request message requesting transmission of radio signals via the communications system, and if the reception quality is greater than or equal to a predetermined threshold value, sends by the communications unit an offer message containing the reception quality to the other user;

if the communications unit receives from the other user a response message, which notifies a connection to the other user via the communications system for transmitting the radio signal, establishes by the communications unit the connection to the other user and transmits the radio signal to the other user.

The user can be, for example, the second user in one of the proposed Car-2-X communications systems according to the first aspect of the proposals.

The Car-2-X communications system can be, for example, one of the proposed Car-2-X communications systems according to the first aspect of the proposals, and the other user can be, for example, one of the proposed users according to the second aspect of the proposals.

The proposed users according to the second aspect and the proposed users according to the third aspect can be combined in any way to suit requirements, in particular combined in full or in part.

According to a fourth aspect, the inventors propose a method for receiving or processing radio signals in a Car-2-X communications system, in particular in one of the proposed Car-2-X communications systems, wherein the communications system comprises at least two users;

a first reception quality of a first radio signal, which is received by a first user, is monitored;

a second reception quality of a second radio signal, which is received by a second user, is monitored;

if the first reception quality is less than a predetermined first threshold value, a request message requesting transmission of radio signals via the communications system is generated and is sent into the communications system;

if the request message is received and if the second reception quality is greater than or equal to a predetermined second threshold value, an offer message containing the second reception quality is sent to the first user;

if the offer message is received, the second user is selected or is not selected as a partner on the basis of this offer message;

if the second user is selected as a partner, a response message, which notifies a connection to the partner via the communications system for transmitting the second radio signal, is generated and sent to the partner;

the connection between the first user and the partner is established, and the second radio signal is transmitted to the first user;

in the first user, the transmitted second radio signal is substituted for the first radio signal.

According to a fifth aspect, the inventors propose a method for receiving or processing radio signals in a Car-2-X communications system, in particular in one of the proposed Car-2-X communications systems, wherein the communications system comprises at least two users;

a first reception quality of a first radio signal, which is received by a first user, is monitored;

if the first reception quality is less than a predetermined threshold value, a request message requesting transmission of radio signals via the communications system is generated and is sent into the communications system;

if an offer message is received, which contains a second reception quality of a second radio signal received by a second user, on the basis of this offer message the second user is selected or is not selected as a partner;

if the second user is selected as a partner, a response message, which notifies a connection to the partner via the communications system for transmitting the second radio signal, is generated and sent to the partner;

the connection to the partner is established;

in the first user, the transmitted second radio signal is substituted for the first radio signal.

According to a sixth aspect, the inventors propose a method for receiving or processing radio signals in a Car-2-X communications system, in particular in one of the proposed Car-2-X communications systems, wherein the communications system comprises at least two users;

a reception quality of a radio signal, which is received by a second user, is monitored;

if a request message requesting transmission of radio signals via the communications system is received from a first user, and if the reception quality is greater than or equal to a predetermined threshold value, an offer message containing the reception quality is sent to the first user;

if a response message, which notifies a connection to the first user via the communications system for transmitting the radio signal, is received by the first user, the connection to the first user is established and the radio signal is transmitted to the first user.

The proposed methods according to the fifth and sixth aspect can be combined in any way to suit requirements, in particular combined in full or in part.

For each of the proposed methods according to the fourth, fifth and sixth aspect, the Car-2-X communications system can be, for example, one of the proposed Car-2-X communications systems according to the first aspect, can be the first user, for example one of the proposed users according to the second aspect, and can be the second user, for example one of the proposed users according to the third aspect.

Each of the users in one of the proposed Car-2-X communications systems according to the first aspect and in one of the proposed methods according to the fourth, fifth and sixth aspect, and each of the proposed users according to the second and third aspect, can be designed in any way to suit requirements, for example as a vehicle or as an infrastructure station.

The embodiments relating to one of the aspects, in particular to individual features of this aspect, also apply correspondingly in a similar manner to the other aspects.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
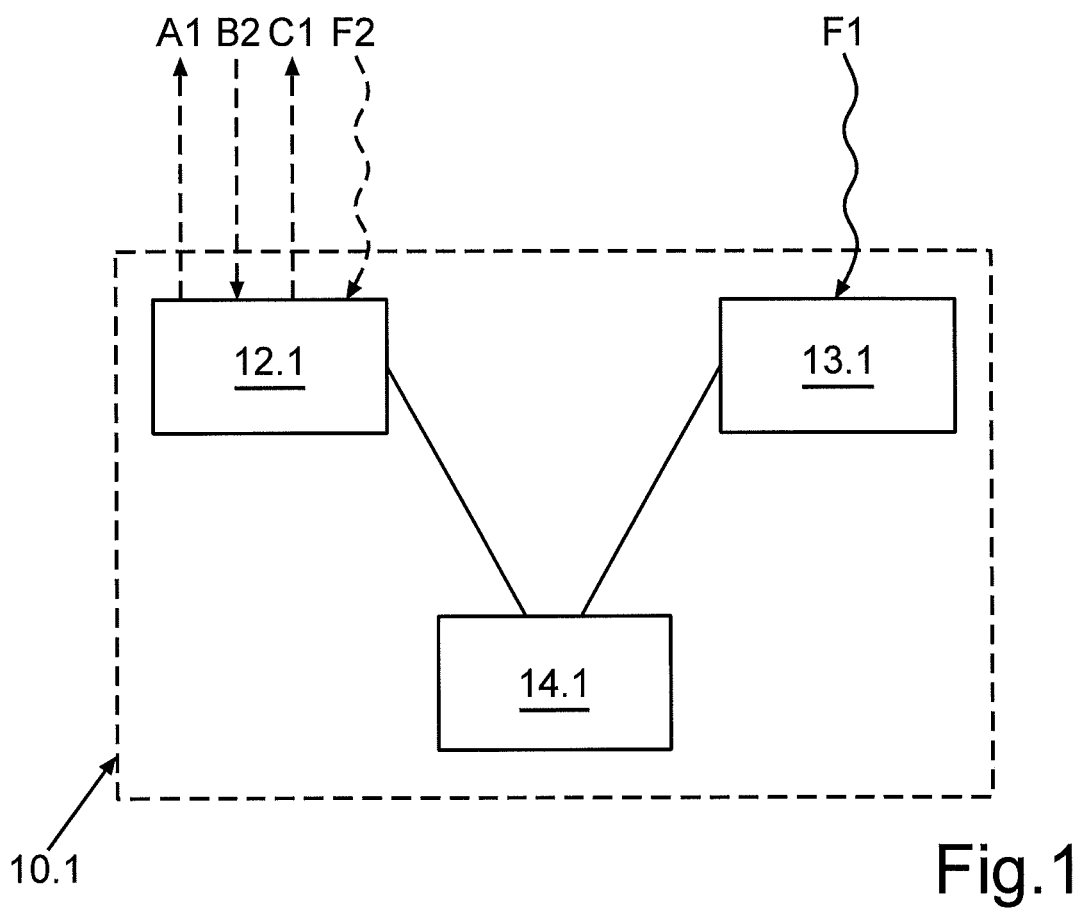
FIG. 1 shows a vehicle in a first embodiment as a user in a Car-2-X communications system.

Reference will now be made in detail to the preferred embodiments of the present invention, examples of which are illustrated in the accompanying drawings, wherein like reference numerals refer to like elements throughout.

Figure 3:
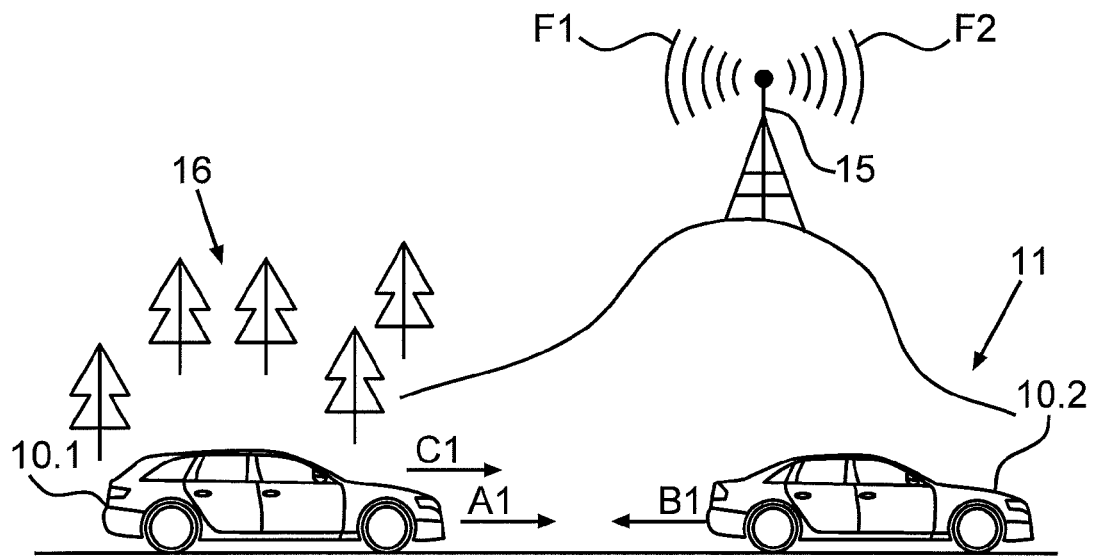
FIG. 3 shows a Car-2-X communications system in a preferred embodiment containing the vehicles of FIG. 1 and FIG. 2.

FIG. 1 shows schematically a vehicle 10.1 as a first embodiment of a user 10.1 in a Car-2-X communications system 11 (FIG. 3). This vehicle 10.1 is here in the form of a car and comprises a first communications unit 12.1 for receiving messages from the communications system 11 and for sending messages into the communications system 11, a first radio receiver 13.1 for receiving first radio signals F1, and a first control unit 14.1, which is coupled to the first communications unit 12.1 and to the first radio receiver 13.1.

In this first embodiment, the first radio receiver 13.1 is a car radio and hence the first radio signals F1 are radio-station broadcasting signals.

The first control unit 14.1 is designed such that it monitors a first reception quality of a first radio signal F1 received by the first radio receiver 13.1, such that, if the first reception quality is less than a predetermined first threshold value, it generates a request message A1 requesting transmission of radio signals F2 via the communications system 11, and sends by the first communications unit 12.1 said request message into the communications system 11, that, if the communications unit 12.1 receives from another user 10.2 (FIG. 2 and FIG. 3) of the communications system 11 an offer message B2, which contains a second reception quality of a radio signal F2 received by the other user 10.2, it selects or does not select the other user 10.2 as a partner on the basis of this offer message B2, that, if a partner 10.2 is selected, it generates a response message C1, which notifies a connection to the partner 10.2 via the communications system 11 for transmitting the radio signal F2 received by the partner 10.2, and sends by the first communications unit 12.1 said response message to the partner 10.2, that it establishes the connection to the partner 10.2 by the first communications unit 12.1, and that it routes the transmitted radio signal F2 to the first radio receiver 13.1 and instructs same to substitute this transmitted radio signal F2 for the radio signal F1 that it receives.

The first radio receiver 13.1 then feeds to an audio amplifier (not shown) the transmitted radio signal F2 instead of the radio signal F1 that it receives.

In this first embodiment, the first control unit 14.1 is designed such that if the first reception quality is greater than or equal to the first threshold value, the connection to the partner 10.2 is cleared by the first communications unit 12.1.

Figure 2:
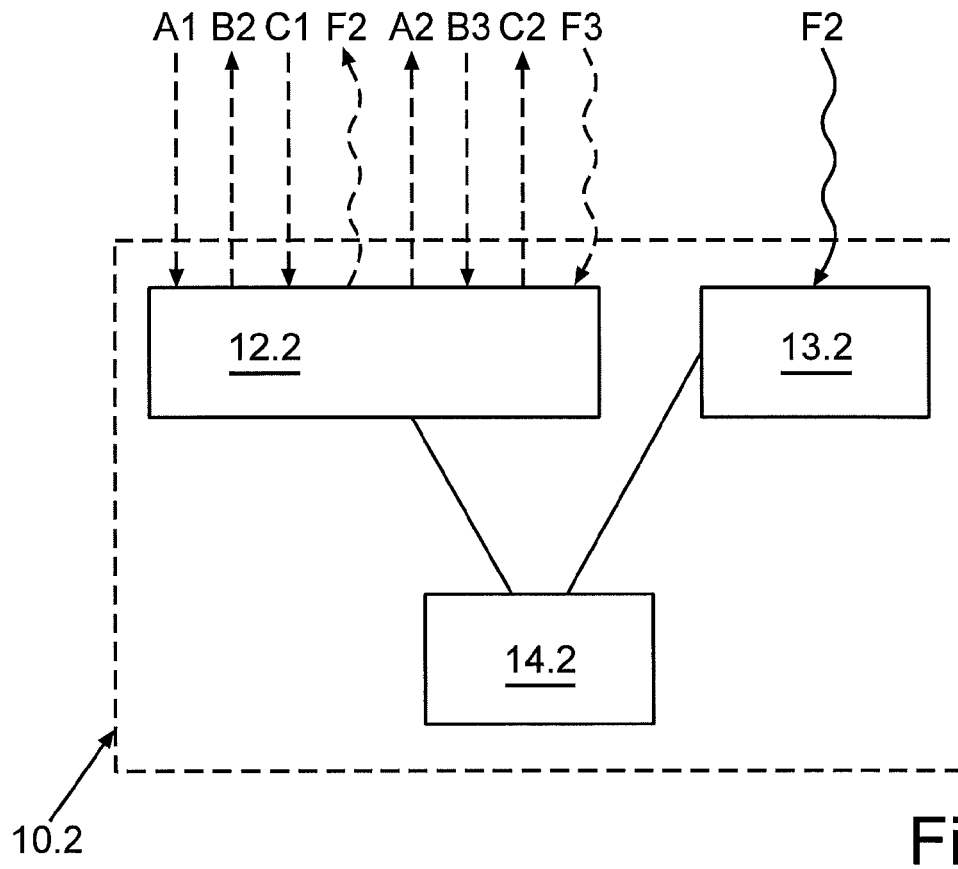
FIG. 2 shows a vehicle in a second embodiment as a user in a Car-2-X communications system.

FIG. 2 shows schematically a vehicle 10.2 as a second embodiment of a second user 10.2 in a Car-2-X communications system 11 (FIG. 3). This second embodiment is similar to the first embodiment, and therefore only the differences are described in detail below.

This vehicle 10.2 comprises a second communications unit 12.2 for receiving messages from the communications system 11 and for sending messages into the communications system 11, a second radio receiver 13.2 for receiving second radio signals F2, and a second control unit 14.2, which is coupled to the second communications unit 12.2 and to the second radio receiver 13.2.

In this second embodiment, the second radio receiver 13.2 is a car radio and hence the second radio signals F2 are radio-station broadcasting signals.

In this second embodiment, the second control unit 14.2 is designed such that it monitors a second reception quality of a second radio signal F2 received by the second radio receiver 13.2, that, if the second communications unit 12.2 receives the request message A1 from the first vehicle 10.1 and if the second reception quality is greater than or equal to a predetermined second threshold value, sends by the second communications unit 12.2 the offer message B2 to the first vehicle 10.1, that, if the second communications unit 12.2 receives the response message C1 from the first vehicle 10.1, establishes by the second communications unit 12.2 the connection to the first vehicle 10.1 and transmits the second radio signal F2 to the first vehicle 10.1.

This second embodiment is hence similar to the first embodiment, because the second communications unit 12.2, the second radio receiver 13.2 and the second control unit 14.2 have a similar design to the first communications unit 12.1, the first radio receiver 13.1 and the first control unit 14.1.

Hence the second control unit 14.2 is further designed such that, if the second reception quality is less than the second threshold value, it generates a request message A2 requesting transmission of radio signals F3 via the communications system 11, and sends by the second communications unit 12.2 said request message into the communications system 11, that, if the communications unit receives from another user of the communications system 11 an offer message B3, which contains a third reception quality of a radio signal F3 received by the other user, it selects or does not select the other user as a partner on the basis of this offer message B3, that, if a partner is selected, it generates a response message C2, which notifies a connection to the partner via the communications system 11 for transmitting the radio signal F3 received by the partner, and sends by the second communications unit 12.2 said response message to the partner, that it establishes the connection to the partner by the second communications unit 12.2, and that it routes the transmitted radio signal F3 to the second radio receiver 13.2 and instructs same to substitute this transmitted radio signal F3 for the radio signal F2 that it receives.

Thus the second vehicle 10.2 can be used not only as a source for a requested better radio signal F2, for example requested by the first vehicle 10.1, but can also itself, like the first vehicle 10.1, request a better radio signal F3 if necessary.

FIG. 3 shows schematically a Car-2-X communications system 11 in a preferred embodiment. This communications system 11 comprises at least two users 10, which are formed here by the users of FIG. 1 and FIG. 2, or to be precise vehicles 10.1 and 10.2.

A proposed method for receiving radio signals F in a Car-2-X communications system 11 is described below with reference to this communications system 11.

The first user, or to be precise the first vehicle 10.1, receives the first radio signal F1 and monitors the first reception quality of the first radio signal F1. The second user, or to be precise the second vehicle 10.2, receives the second radio signal F2 and monitors the second reception quality of the second radio signal F2. Both radio signals F1, F2 are sent by the same radio transmitter mast 15 on the same channel. The first vehicle 10.1 is currently driving through a forest 16, which lies between the first vehicle 10.1 and the radio transmitter mast 15 and impairs direct aerial-reception of the first radio signal F1. The second vehicle 10.2 has already passed through the forest 16 and is currently driving on the same road in front of the first vehicle 10.1 through open countryside, and therefore there is no obstacle between the second vehicle 10.2 and the radio transmitter mast 15, and direct aerial-reception of the second radio signal F2 is not impaired.

If the first reception quality is less than the first threshold value, the first vehicle 10.1 generates the request message A1 and sends it into the communications system 11. If the second vehicle 10.2 receives the request message A1, and if the second reception quality is greater than or equal to the second threshold value, it sends the offer message B2 to the first vehicle 10.1. If the first vehicle 10.1 receives the offer message B2, it selects or does not select the second vehicle 10.2 as a partner on the basis of this offer message B2. To do this, it compares the first reception quality with the second reception quality and selects the second vehicle 10.2 as a partner if the second reception quality is greater than the first reception quality. If the second vehicle 10.2 is selected as a partner, the first vehicle 10.1 generates the response message C1 and sends same to the second vehicle 10.2. As a result, the two vehicles 10.1, 10.2 establish the connection between one another, and the second vehicle 10.2 transmits via this connection the second radio signal F2 to the first vehicle 10.1. Then the first vehicle 10.1 substitutes the second radio signal F2 transmitted in this way for the first radio signal F1.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A Car-2-X communications system, comprising:
at least first and second users, wherein
the first user comprises:
a first communications unit to receive messages from the second user of the communications system and to send messages to the second user of the communications system;
a first radio receiver to receive radio signals with a first reception quality; and
a first control unit coupled to the first communications unit and to the first radio receiver,
the first control unit is configured to monitor the first reception quality and generate a request message if the first reception quality is less than a predetermined first threshold value, the request message requesting receipt of radio signals via the first communications unit,
the first communications unit sends the request message,
the first communications unit receives from the second user an offer message, which specifies a second reception quality at which radio signals are received by the second user,
the first control unit is configured to evaluate the second user as a potential communication partner based on the offer message,
the first control unit is configured to generate a response message if the second user is selected as the communication partner, the response message notifying the second user regarding a connection to the second user for transmitting radio signals received by the second user,
the first communication unit sends the response message to the second user,
the first control unit is configured to establish the connection to the second user by way of the first communications unit, to receive forwarded radio signals from the second user,
the first control unit is configured to route the forwarded radio signals to the first radio receiver and instruct the first radio receiver to substitute the forwarded radio signals for the radio signals having the first reception quality;

the second user comprises:
a second communications unit to receive messages from the first user and to send messages to the first user;
a second radio receiver to receive radio signals with the second reception quality; and
a second control unit coupled to the second communications unit and to the second radio receiver,
the second communications unit receives the request message from the first user,
the second control unit is configured to monitor the second reception quality, and if the second reception quality is greater than or equal to a predetermined second threshold value, to send the offer message to the first user by way of the second communications unit,
the second control unit is configured to establish the connection with the first user by way of the second communications unit, if the second communications unit receives the response message, and
the second control unit is configured to transmit, as the forwarded radio signals, the radio signals received by the second radio receiver, the forwarded radio signals being transmitted to the first user.

2. The communications system as claimed in claim 1, wherein
the first control unit clears the connection to the second user if the first reception quality improves and becomes greater than or equal to the first threshold value.

3. The communications system as claimed in claim 2, wherein the second control unit generates a requesting message if the second reception quality is less than the predetermined second threshold value, the requesting message requesting receipt of radio signals via the second communications unit.

4. The communications system as claimed in claim 1, wherein
the first control unit sets the first threshold value to be equal to the second reception quality.

5. The communications system as claimed in claim 1, wherein the request message contains information identifying the first reception quality.

6. The communications system as claimed in claim 5, wherein
the second control unit sets the second threshold value to be equal to the first reception quality.

7. The communications system as claimed in claim 1, wherein
the first control unit adds to the request message information about a station or channel currently set in the first radio receiver.

8. The communications system as claimed in claim 1, wherein
the first radio receiver produces a user output for a first channel or a first radio station,
the second radio receiver comprises first and second receiver units coupled to the second control unit,
the first receiver unit of the second radio receiver produces a user output for a second channel or a second radio station,
the request message contains information specifying that the first user requires the first channel or first radio station, and
the second control unit tunes the second receiver unit to the first channel or first radio station.

9. The communications system as claimed in claim 1, wherein
the second user further comprises a navigation unit, which is coupled to the second control unit, the second control unit determines a current location of the second user by way of the navigation unit, and the second control unit adds the current location to the offer message.

10. The communications system as claimed in claim 9, wherein the second user is evaluated as the potential communication partner based on the current location of the second user and based on the second reception quality at which radio signals are received by the second user.

11. The communications system as claimed in claim 1, wherein the first user further comprises a navigation unit, which is coupled to the first control unit, the first control unit determines a current location of the first user by way of the navigation unit, and the first control unit adds the current location to the request message.

12. The communications system as claimed in claim 1, wherein the first user is outside of a communication range of the second user, and messages are sent between the first and second users by way of the third user.

13. The communications system as claimed in claim 1, wherein both the first and second radio receivers are broadcast radio receivers.

14. The communications system as claimed in claim 1, wherein both the first and second radio receivers receive broadcast analog radio signals, broadcast digital radio signals, broadcast analog TV signals, or broadcast digital TV signals.

15. A first user in a Car-2-X communications system comprising at least first and second users, the first user comprising:

a first communications unit to receive messages from the second user of the communications system and to send messages to the second user of the communications system;

a first radio receiver to receive radio signals with a first reception quality; and a first control unit coupled to the first communications unit and to the first radio receiver, the first control unit is configured to monitor the first reception quality and generate a request message if the first reception quality is less than a predetermined first threshold value, the request message requesting receipt of radio signals via the first communications unit, the first communications unit sends the request message, the first communications unit receives from the second user an offer message, which specifies a second reception quality at which radio signals are received by the second user, the first control unit is configured to evaluate the second user as a potential communication partner based on the offer message, the first control unit is configured to generate a response message if the second user is selected as the communication partner, the response message notifying the second user regarding a connection to the second user for transmitting radio signals received by the second user, the first communication unit sends the response message to the second user, the first control unit is configured to establish the connection to the second user by way of the first communications unit, to receive forwarded radio signals from the second user, the first control unit is configured to route the forwarded radio signals to the first radio receiver and to instruct the first radio receiver to substitute the forwarded radio signals for the radio signals having the first reception quality, wherein the second user comprises:

a second communications unit to receive messages from the first user and to send messages to the first user;

a second radio receiver to receive radio signals with the second reception quality; and a second control unit coupled to the second communications unit and to the second radio receiver, the second communications unit receives the request message from the first user, the second control unit is configured to monitor the second reception quality, and if the second reception quality is greater than or equal to a predetermined second threshold value, to send the offer message to the first user by way of the second communications unit, the second control unit is configured to establish the connection with the first user by way of the second communications unit, if the second communications unit receives the response message, and the second control unit is configured to transmit, as the forwarded radio signals, the radio signals received by the second radio receiver, the forwarded radio signals being sent to the first user.

16. A second user in a Car-2-X communications system comprising first and second users, the second user comprising:

a second communications unit to receive messages from the first user and to send messages to the first user;

a second radio receiver to receive radio signals with a second reception quality; and a second control unit, which is coupled to the second communications unit and to the second radio receiver, wherein the second communications unit receives a request message from the first user, the request message requesting transmission of radio signals via the second communications unit, the request message specifying a first reception quality at which the first user is receiving radio signals, the second control unit is configured to:

monitor the second reception quality;

send an offer message to the first user if the second reception quality is greater than or equal to a predetermined second threshold value, the offer message being sent by way of the second communications unit;

establish by way of the second communications unit, a connection to the first user if the second communications unit received from the first user, a response message, which indicated the connection to the first user for transmitting radio signals; and transmit, as forwarded radio signals, the radio signals received by the second radio receiver, the forwarded radio signals being transmitted to first user, wherein the first user comprises:

a first communications unit to receive messages from the second user and to send messages to the second user;

a first radio receiver to receive radio signals with the first reception quality; and a first control unit coupled to the first communications unit and to the first radio receiver, the first control unit monitoring the first reception quality and generating the request message if the first reception quality is less than a predetermined first threshold value, the first control unit evaluating the second user as a potential communication partner based on the offer message, the first control unit generating the response message if the second user is selected as the communication partner, the first control unit receiving the forwarded radio signals from the second user and routing the forwarded radio signals to the first radio receiver, the first control unit instructing the first radio receiver to substitute the forwarded radio signals for the radio signals having the first reception quality.

17. A method for receiving radio signals in a Car-2-X communications system comprising at least first and second users, the method comprising:
  receiving radio signals at the first user with a first reception quality;
  monitoring the first reception quality;
  receiving radio signals at the second user with a second reception quality;
  monitoring the second reception quality;
  if the first reception quality is less than a predetermined first threshold value, generating a request message requesting transmission of radio signals between the first and second users;
  sending the request message to the second user;
  if the request message is received and if the second reception quality is greater than or equal to a predetermined second threshold value, sending an offer message to the first user, the offer message specifying the second reception quality;
  evaluating the second user as a potential communication partner based on the offer message;
  if the second user is selected as the communication partner, generating a response message indicating a communication connection between the first and second users for transmitting forwarded radio signals;
  sending the response message to the second user;
  establishing the communication connection between the first and second users;
  transmitting, as the forwarded radio signals, the radio signals received by the second user, the forwarded radio signals being transmitted from the second user to the first user; and
  substituting, at the first user, the forwarded radio signals for the radio signals received with the first reception quality.

* * * * *